Feb. 17, 1925.　　　　　　　　　　　　　　　　　　1,526,704
A. HIRD
COMBINED HAY OR GRAIN WAGON AND MANURE CARRIER AND SPREADER
Filed Dec. 14, 1922　　　6 Sheets-Sheet 1
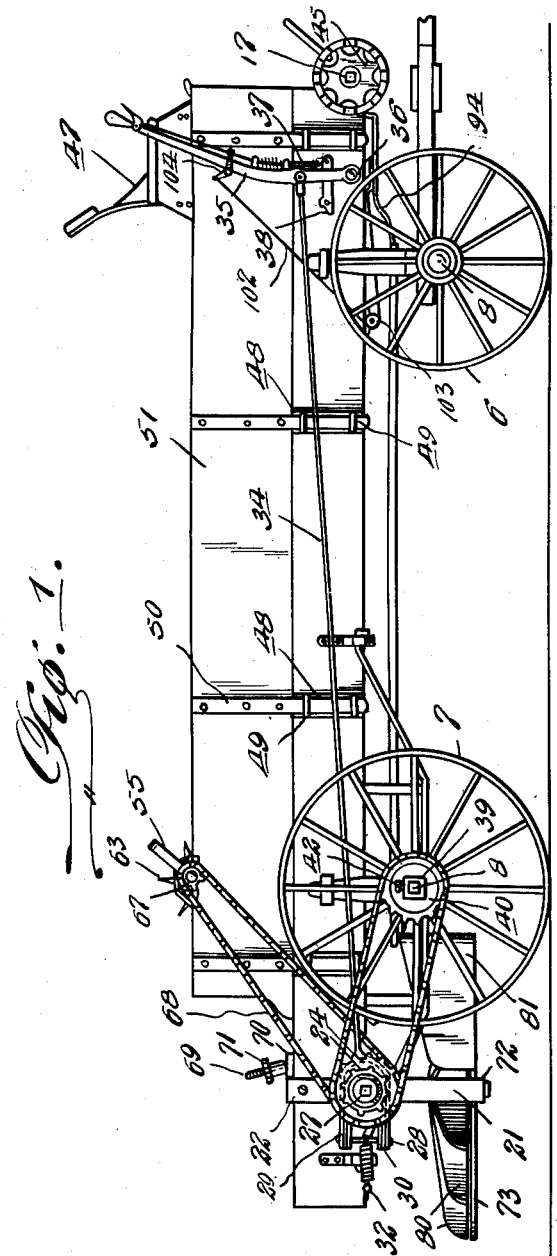
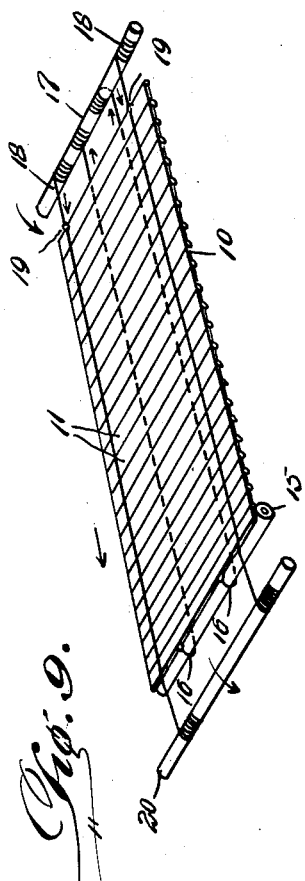
Witnesses:
Arthur Hird,
INVENTOR.
BY
ATTORNEY.

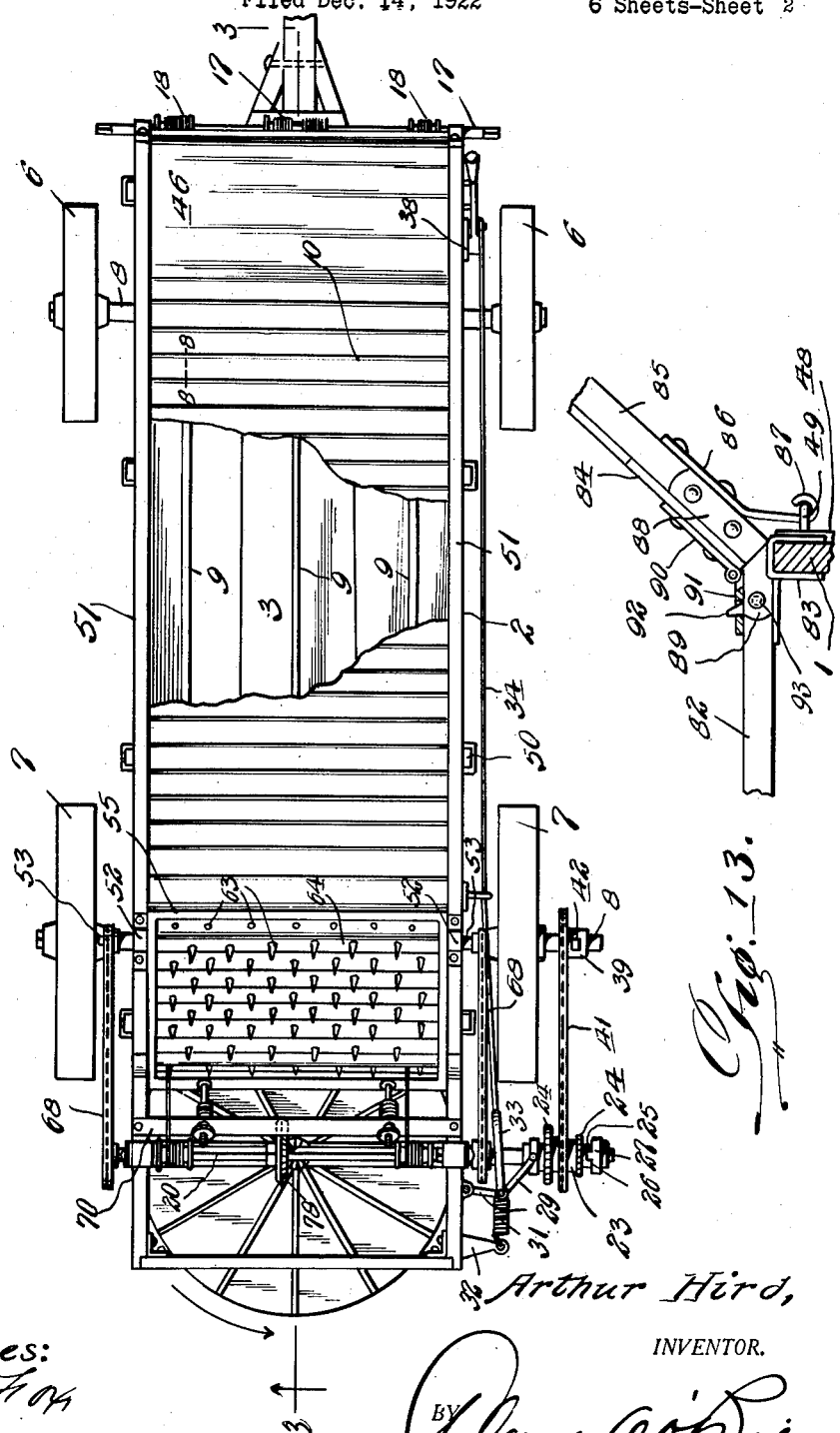

Feb. 17, 1925.  
A. HIRD  
1,526,704  
COMBINED HAY OR GRAIN WAGON AND MANURE CARRIER AND SPREADER  
Filed Dec. 14, 1922  
6 Sheets-Sheet 3
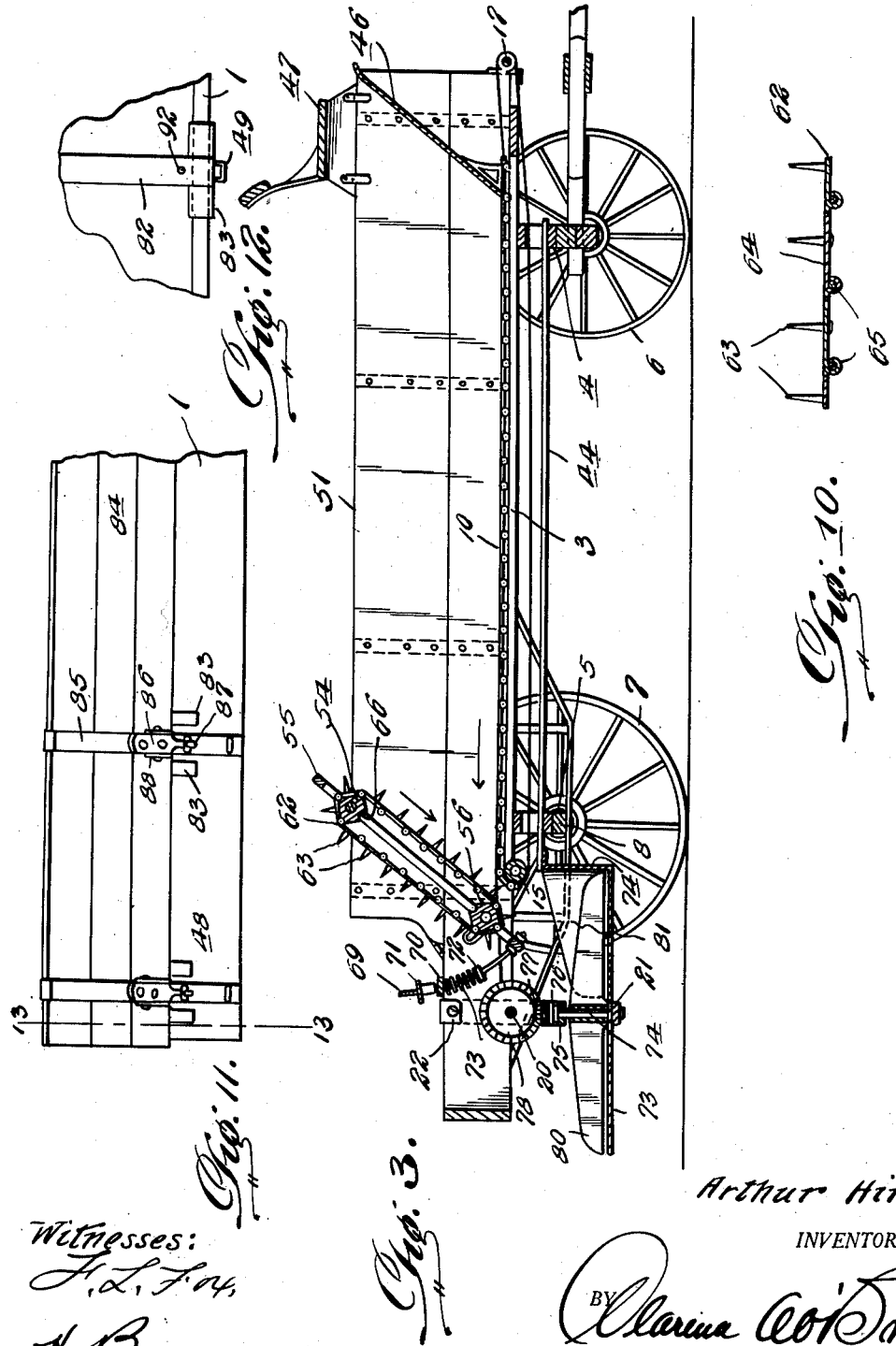
Arthur Hird,
INVENTOR.
ATTORNEY.

Feb. 17, 1925.
A. HIRD
1,526,704
COMBINED HAY OR GRAIN WAGON AND MANURE CARRIER AND SPREADER
Filed Dec. 14, 1922     6 Sheets-Sheet 4
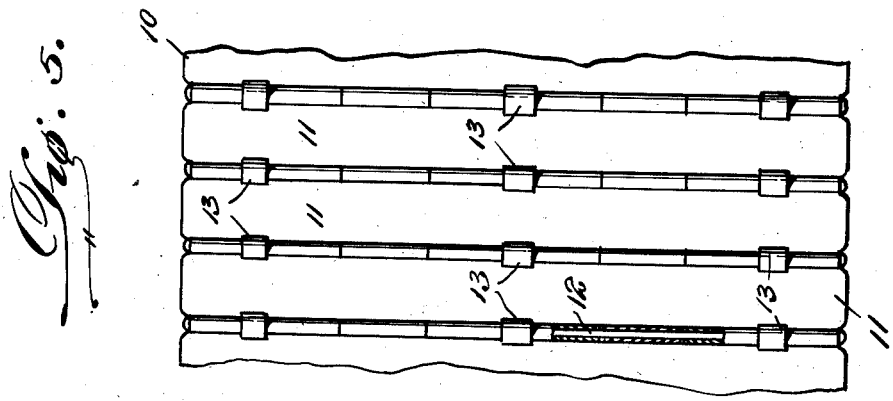
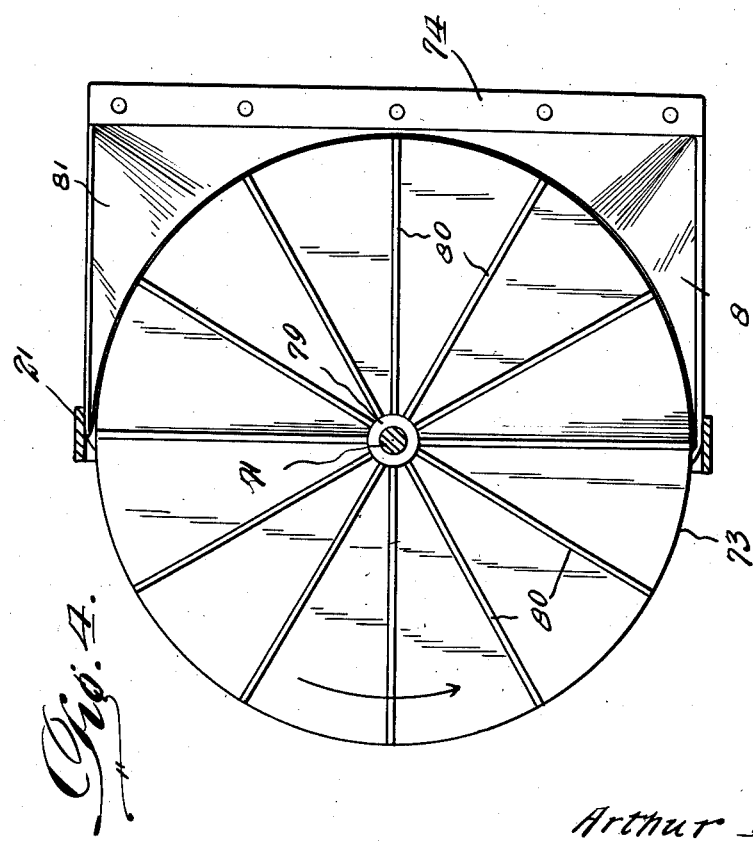
Witnesses:
Arthur Hird,
INVENTOR.
BY
ATTORNEY.

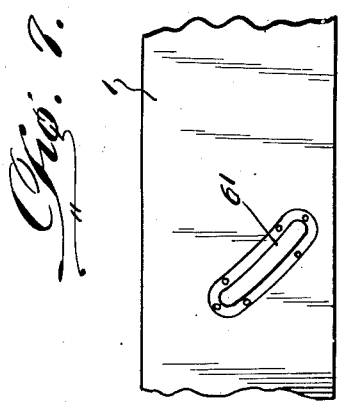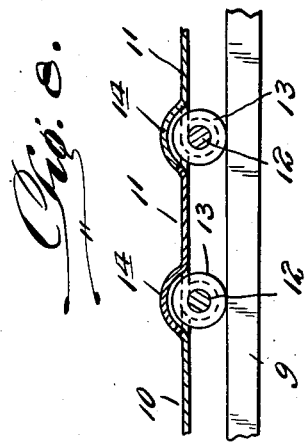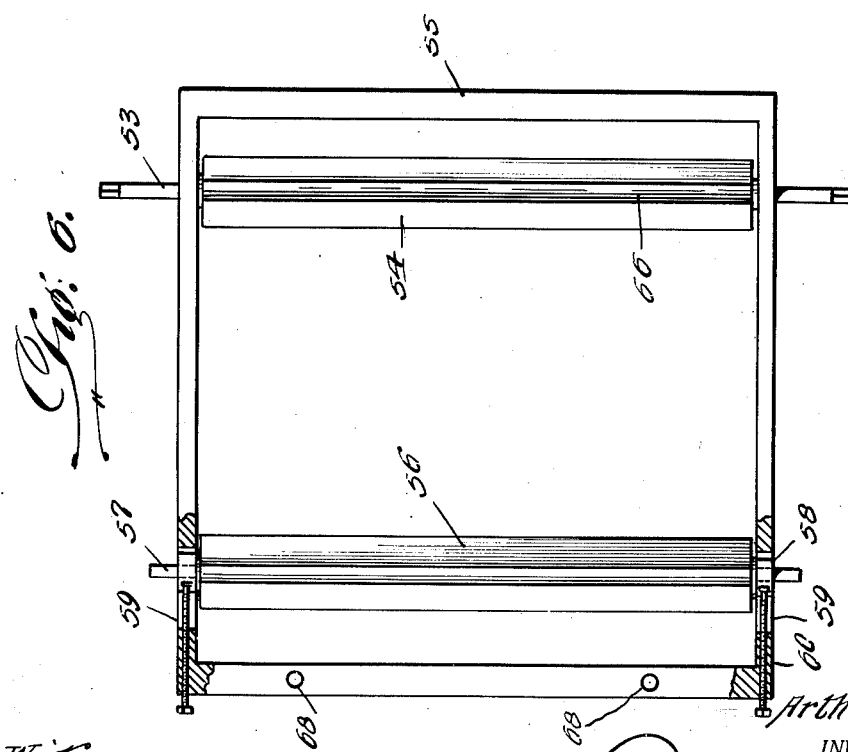

Feb. 17, 1925.
A. HIRD
1,526,704
COMBINED HAY OR GRAIN WAGON AND MANURE CARRIER AND SPREADER
Filed Dec. 14, 1922 6 Sheets-Sheet 6
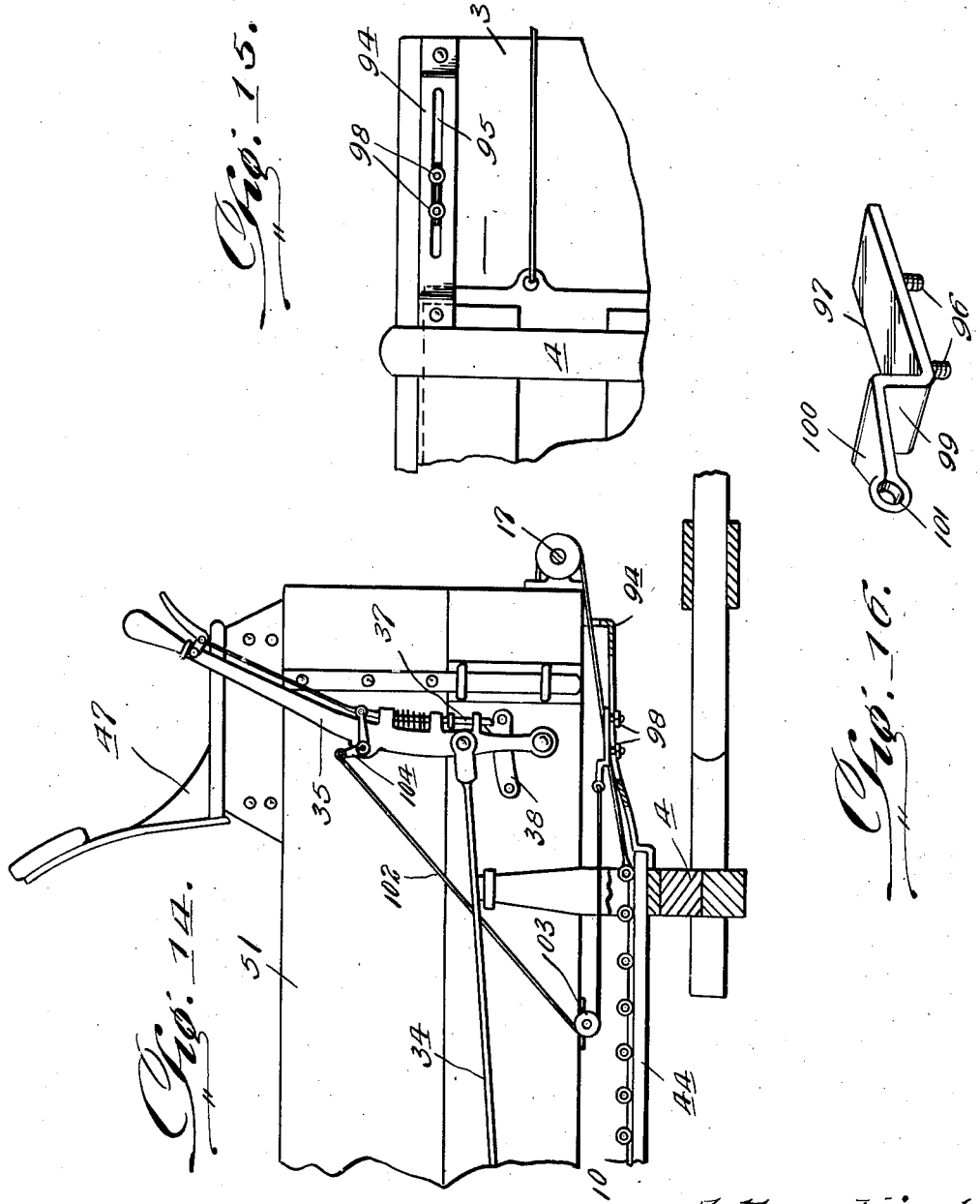

Patented Feb. 17, 1925.

1,526,704

UNITED STATES PATENT OFFICE.

ARTHUR HIRD, OF LAWRENCE, KANSAS.

COMBINED HAY OR GRAIN WAGON AND MANURE CARRIER AND SPREADER.

Application filed December 14, 1922. Serial No. 606,767.

*To all whom it may concern:*

Be it known that I, ARTHUR HIRD, a citizen of the United States, residing at Lawrence, in the county of Douglas and State of Kansas, have invented certain new and useful Improvements in Combined Hay or Grain Wagons and Manure Carriers and Spreaders, of which the following is a specification.

My invention relates to a combined wagon adapted to be so arranged as to properly function as a hay or grain wagon and further, to be adapted so as to function as a manure carrier, means being provided for automatically unloading, and spreading the same whilst the wagon is travelling over the ground.

The primary object of this invention is the provision of such a combination device that is comparatively simple of construction, easy of operation and highly useful for a great number of purposes.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein :—

Figure 1—is a side elevational view of the combined device constructed in accordance with the present invention.

Figure 2—is a top plan view thereof, a portion of the manure unloading means being broken away for more clearly disclosing the wagon flooring.

Figure 3—is a longitudinal setional view view of the device shown in Figures 1 and 2, and taken upon the line 3—3 of Figure 2.

Figure 4—is an enlarged top plan view of the manure spreader per se.

Figure 5—is an enlarged fragmentary plan view of a portion of the manure unloading belt.

Figure 6—is a plan view of the frame for a manure pulverizer device employed in connection with the present invention.

Figure 7—is an enlarged fragmentary side elevational view of one side of the wagon, the same being slotted for allowing of a swinging movement of the lower end of the pulverizer mechanism swinging therein.

Figure 8—is an enlarged fragmentary cross sectional view of the manure unloading belt or platform taken on the line 8—8 of Figure 2.

Figure 9—is a reduced perspective view of the manure unloading belt or platform, together with the means for operating the same.

Figure 10—is a longitudinal cross sectional view of a portion of the manure pulverizing belt.

Figure 11—is a fragmentary side elevational view, showing more clearly the detachable connecting means for the hay or grain rack upon the side frames of the wagon.

Figure 12—is a fragmentary top plan view of one side frame of the wagon with means thereon for detachably receiving the hay or grain rack.

Figure 13—is a fragmentary cross sectional view upon the line 13—13 of Figure 11.

Figure 14—is an enlarged fragmentary elevational view of the front side of the machine, disclosing more clearly, an automatic clutch mechanism.

Figure 15—is a fragmentary bottom plan view of the front end of the machine, and Figure 16 is a perspective view of the sliding plate employed in combination with the automatic clutch actuating mechanism.

With particular reference to the drawings, my improved device embodies the provision of a wagon structure consisting of longitudinal side frame members 1 and 2, together with a flooring 3, which flooring extends from the forward ends of the frame members 1 and 2, to a point spaced inwardly to the rear end thereof, as more clearly shown in the cross sectional view, Figure 3. My device includes the provision of the usual rear and front bolsters 4 and 5 respectively, together with the front and rear supporting wheels 6 and 7 supported upon the opposite ends 8 carried by these bolsters.

The wagon flooring 3 has counter-sunk therein, longitudinally extending spaced roller engaging rails 9, hereinafter more fully described. Freely slidable in a longitudinal direction upon the wagon flooring 3 is a manure unloading belt or platform designated in its entirety, by the numeral 10. As shown more clearly in Figures 5 and 8, this belt or platform 10 is composed of transverse metallic strip members 11 having spaced inter-engaging eyes at their adjacent ends and adapted to receive transversely extending hinge or pivot rods 12. Each of these pivot rods 12 have three spaced rollers 13, freely rotatable thereon, these rollers adapted for rolling contact with the above mentioned countersunk rails 9 in the wagon flooring 3. The portions of the plates 11 above each roller 13 are curved upwardly as at 14 for allowing a free rotary movement of these rollers upon the transverse pivot rods 12. Adjacent the rear end of the wagon flooring 3 there is suitably mounted a transversely extending belt or platform guide roller 15, and with particular reference to Figure 9, there is connected to the end of the belt or platform 10, one end of a pair or cables 16, these cables extending around the roller 15, and thence forwardly beneath the wagon flooring 3 to be connected at their opposite ends to a transversely disposed rotary shaft 17 at the front end of the wagon body. Also connected at one end to this shaft 17 and adapted to be wound thereon, are other cables 18 extending rearwardly over the top surface of the belt or platform 10, and connected to this belt as at 19 at the forward ends thereof. These last mentioned cables 18 are also connected to an operating shaft 20 rearwardly of the belt or platform roller 15, and are adapted to be wound thereon when this shaft 20 is operated.

As before mentioned, this shaft 20 is disposed rearwardly of the belt or platform roller 15, and is journaled at its opposite ends within a substantially U-shaped hanger 21, the upper ends of the side legs comprising this hanger being bent over the side frames 1 and 2 of the wagon body as more clearly shown in Figure 3, to be connected thereto by bolts or rivets 22. The ends of this shaft extend outwardly of the side frame bars of the wagon and one end thereof has a freely slidable sleeve 23 thereon. This sleeve 23 has spaced sprocket gears 24 formed thereon, which gears are of different dimensions, and this sleeve 23 is further provided at its outer end with notches 25 for engaging lugs 26 upon a collar 27 keyed to the adjacent outer end of said shaft 20, when this sleeve is slid outwardly upon the shaft.

Pivotally connected together by a vertical pivot pin or rod 28, are an upper and lower pair of link members 29 and 30 respectively, the ends of these link members being loosely, pivotally secured to the inner end of the sleeve 23 for the side frame 2 of the wagon body. Connected at one end to this pivot pin 28, and between the pairs of links 29 and 30 is a coiled spring 31, the opposite end of which is secured to a bracket 32 carried by the said side frame bar 2 of the wagon body. Secured to the opposite ends of the pivot pin 28 is the yoked end 33 of a forwardly extending rod 34, which rod is pivotally secured at its front end to a hand lever 35. This lever 35 is pivotally secured at its lower end 36 to the wagon body and has a suitable spring actuated detent 37 for engagement with spaced lugs formed on a plate 38 on the wagon body and inwardly of the lever 35, as more clearly shown in Figure 1. The rear wheel carrying axle 8, is adapted to rotate within its bolster support and the end thereof adjacent the sprocket sleeve 23, has a collar 39 slidably positioned therein, which collar is formed with a sprocket gear 40. Engaging over this sprocket gear 40, and any one of the sprocket gears 24 upon the sleeve 23 is a sprocket chain 41, it being understood that whenever it is desired to reduce or increase the speed of the shaft 20, the collar 39 and its sprocket gear 40 is to be adjusted upon the axle 8 for aligning this sprocket gear with a desired one of the sprocket gears 24 of the sleeve 23, this first mentioned sprocket gear 40 being retained in adjusted position upon the end of the axle by a set screw or the like 42. It will at once be apparent, that in view of the upper and lower pairs of links 29 and 30 and the coiled spring 31, the sprocket gear carrying sleeve 23 is normally disengaged from the clutch collar 27 upon the end of a shaft 20 for allowing a free rotary movement of this collar without imparting a similar rotary movement to the shaft 20, when the wagon body is being moved over the ground. By merely pushing forwardly upon the pivoted lever 35 at the front end of the wagon body, the sleeve 23 will be operatively connected to the shaft 20 for rotating this shaft when the wagon is being moved.

When this shaft 20 is rotated, through the instrumentality of the rear supporting wheels 7, and when the clutch mechanism is thrown in, as shown in Figure 2, the cables 19 will be wound thereon. The forward ends of these cables unwinding from the front shaft 17 occasioning a rotary movement of this shaft for winding thereon the front ends of the intermediate cable 16, which action will move the belt or platform 10 rearwardly upon the floor 3 of the wagon, in the direction of the arrow shown in Figure 3, for drawing this belt or platform over the roller 15, and beneath the wagon flooring 3, it being noted that the before mentioned front and rear bolsters 4 and 5 are slotted as clearly shown in Figure 5 for permitting the passage of the cables 16, together with the belt or platform 10 therethrough.

A stationary supporting platform 44 may be provided beneath the wagon flooring 3 for supporting the belt or platform 10 thereon, when the same is extended beneath the flooring of the wagon, and as shown in Figure 1, one or both ends of the front shaft 17 may have any desired form of hand operating means 45 thereon, for rotating this shaft 17 in a reverse direction, for consequently drawing the said belt or platform 10 back upon the wagon flooring 3, when the clutch mechanism between the rear shaft 20 and rear wheel supporting axle 8 is disengaged.

The front end of the movable belt or platform 10 carries a vertically extending, forwardly inclined wall 46 functioning as the rear wall of the wagon body and adapted to move rearwardly with the belt or platform 10 for adequately carrying the manure rearwardly within the wagon, and the wagon body is also provided at the forward end thereof with an operator's seat 47.

The longitudinal side members 1 and 2 of the wagon frame are each provided with spaced stake receiving members 48, which are in the form of plates having upper and lower stake receiving eyes 49 formed thereon. Adapted to be received within these eyes 49 of the plates 48 are the lower ends of stakes 50, carried by longitudinally disposed side boards 51, adapted for engagement upon the upper edge of the side members 1 and 2 of the wagon frame. Journaled within bearings 52 upon the upper edge of the side boards 51, and slightly inwardly of the rear end thereof, are the opposite ends of a roller carrying shaft 53. This shaft 53 carries a roller 54, and is also journaled within suitable openings at the front end of a substantially rectangular open frame 55. This frame 55 extends downwardly at an angle within the wagon body, and has at its lower end, a roller 56 upon a shaft 57, the ends of which are journaled in bearings 58, slidably disposed in slots 59 at the opposite sides of the rectangular frame 55. The bearings 58 for the roller shaft 57 are adjustably positioned within the frame, by screw bolts 60 connected at one end to these bearings, and screw threadedly engaging within suitable screw threaded bores of the frame, the opposite ends of the roller shaft 57 engage through arcuate slots 61, in the side members 1 and 2 of the wagon frame, and engaging over the rollers 54 and 56 is an endless pulverizing belt 62 having prongs or the like 63 thereon. As more clearly shown in Figure 10, this pulverizing belt 62 is composed of transverse metallic strips 64 hingedly connected by pins 65 to each other. The rollers 54 and 56 are square in cross section, and the edges thereof are channeled as at 66 for receiving therein, the hinge connections of the pulverizer belt when these rollers are rotated.

Each projecting end of the top roller shaft 53 has a sprocket gear 67 keyed thereto and engaging over each of these sprockets, is a sprocket chain 68, which extends downwardly, and engages over alined sprocket gears upon the shaft 20, outwardly of the side walls or frame members 1 and 2 of the wagon body, whereby, when the shaft 20 is rotated a similar rotary movement will be imparted to the shaft 53 for moving the pulverizer belt 62 in the direction of the arrow, Figure 3, for uniformly pulverizing or cutting up the manure as it passes rearwardly within the wagon body, upon the movable belt or platform 10.

The bottom cross bar of the rectangular frame 55 is provided with a pair of openings 68, and engaging within each of these openings is one end of a vertically extending arcuate rod 69. The upper ends of each of these rods pass through suitable openings in a transverse cross bar 70 between the side members 1 and 2 of the wagon frame or body and are screw threaded for receiving thereon, a thumb nut 71. Between this transverse bar 70 and a collar 72 on each of the arcuate rods or bars 69 is a relatively strong coiled spring 73, normally tending to force the pulverizer frame into a position adjacent the belt or platform 10, but allowing this frame to swing away from the belt or platform for permitting large lumps of material to pass between the pulverizer belt, and the movable belt or platform 10, when these devices are operated.

Supported upon the bottom cross member of the before described U-shaped hanger 21 for the shaft 20, is a pan or trough 73' having a rear vertical wall 74 adapted for attachment in any manner desirable to the underframe of a wagon body. Journaled at one end within a suitable opening centrally of the bottom cross member of the said shaft hanger 21, is a shaft 74. The upper end of this shaft extends through an opening in a transverse bar 75, formed upon the U-shaped shaft hanger 71. A suitable form of roller bearing 76 is provided for the shaft 74. The upper end of the shaft carries a bevelled gear 77 meshing with a relatively larger bevelled gear 78, keyed to the shaft 20. Keyed to the shaft 74, above the pan 73' is a collar 79, provided with a plurality of spaced radiating spreader arms 80. The pan or trough 73' is adapted to receive the manure from the movable belt or platform 10 and the arms 80 rotating thereabove, receive the manure between adjacent ones thereof, and adequately spreads the same over the ground. As a means for limiting this spreading action to the front of the pan or trough 73' only, the rear wall 74 thereof, is provided with suitably shaped forwardly extending aprons 81.

In view of the above description, it will at once be apparent that my device is adapted for unloading and spreading the manure in a simple and expeditious manner, and whenever it is desirable to employ the wagon body as a hay or grain rack, the longitudinal frames boards 51 are removed, together with the pulverizing frame 55 and its associate parts. The movable belt or platform 10 is extended upwardly to a position as shown in Figure 3, and as shown in Figure 13, arms or bars 82 are positioned across the top of the side frame members 1 and 2 of the wagon body. These cross bars are provided with U-shaped cleats 83 at their ends, for engaging over the side members of the wagon frame, and at both sides of the above described stake receiving plates. The detachably outwardly converging side walls 84 of the hay or grain rack have spaced bars 85 upon the outer surfaces thereof, these bars adapted to aline with the said stake receiving plates 48 on the side frame of the wagon body. Upon the lower end of each of these bars 85 are plates 86, the lower ends of which extend away from the bars, and are hooked as at 87 for engaging within the top eye member 49 of the stake receiving plates 48. Further, each of the bars 85 are provided with side plates 88 at the lower end thereof, which plates are formed with an inwardly extending end portion 89, and secured to the side walls 84, and above each of the bars 85 are still further plates 90 having a hinged arm 91 at the lower end thereof, these hinged arms being suitably perforated for receiving projecting pins 92 upon the horizontal portion 89 of the side plates 88 on the bars 85, when these arms are positioned as shown in Figure 13, detachable pin connections 93 are provided between the horizontal portions 89 of the side plates 88, and transversely extending bars 82 for rigidly maintaining the side walls 85 in position upon the frame members 1 and 2 of the wagon body.

In Figures 14, 15 and 16, I have shown an automatic clutch throw out mechanism specifically adapted for the disengagement of the clutch sleeve 23 of the collar 27 on the shaft 20, when the unloading belt or platform 10 has reached the limit of movement within the wagon body. This means includes the provision of a forwardly extending plate 94, secured at one end to one side of the before mentioned belt supporting board or platform 44 beneath the bottom of the machine, and at its forward end, through the wagon flooring 3. This plate 94 is longitudinally slotted as at 95 and engaging through this slot are integral bolt member 96 pendently formed upon an angular plate 97, this plate being maintained in position upon the first mentioned plate 94, by nuts 98 engaging over the bolts 96, these bolts being screw threaded for this purpose. As clearly shown in Figures 14 and 16, the front end of the plate 97 has a vertically extending portion 99, also carrying a forwardly extending arm 100. The front end of this arm is eyed as at 101, for receiving one end of a cable 102, this cable passing rearwardly of the wagon body and engaging over a roller 103, the cable thence passing upwardly and forwardly and being connected to one arm of a bell crank lever 104. As shown, this bell crank is pivoted to a suitable point upon the clutch operating lever 35, and the opposite arm of this bell crank has pivotal connection with the detent 37.

When the unloading belt 10 is moving rearwardly within the wagon in its unloading operation, the front portion of this belt will be moving forwardly upon the supporting platform 44, and as the front end of this belt engages the vertical portion 99 of the plate 97, this plate 97 will be slid forwardly upon its support 94 for consequently pulling upon the cable 102 for actuating the bell crank 104 for thereby disengaging the detent 37 from the forward lug upon the plate 38, and in view of the spring tension upon the clutch links 29 and 30, the clutch leaf 23 will consequently become disengaged.

In view of the above description, it will be seen that I have devised a combination device that may be readily used as a manure unloader and spreader on a hay or grain rack, and while I have herein shown and described the preferred embodiments of the present invention, it is nevertheless to be understood that minor changes may be made therein, without departing from the spirit and scope of the invention as claimed.

What I claim as new is:—

In a machine of the character described, a support, a flexible platform mounted for movement along the support, said platform including a plurality of transverse extending strips having spaced interengaging eyes at their adjacent edges, a plurality of transversely extending hinge rods disposed through the eyes, rollers supported to rotate on said rods between the eyes, said strips being provided with upwardly curved portions to accommodate said rollers in order that they may rotate freely.

In testimony whereof I affix my signature.

ARTHUR HIRD.